(12) United States Patent
Guinan

(10) Patent No.: US 9,565,211 B2
(45) Date of Patent: *Feb. 7, 2017

(54) MANAGING EXCHANGES OF SENSITIVE DATA

(71) Applicant: True Ultimate Standards Everywhere, Inc., San Francisco, CA (US)

(72) Inventor: Daniel J. Guinan, Omaha, NE (US)

(73) Assignee: TRUE ULTIMATE STANDARDS EVERYWHERE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/841,543

(22) Filed: Mar. 15, 2013

(65) Prior Publication Data

US 2014/0282834 A1 Sep. 18, 2014

(51) Int. Cl.
*H04L 29/06* (2006.01)

(52) U.S. Cl.
CPC ................... *H04L 63/20* (2013.01)

(58) Field of Classification Search
None
See application file for complete search history.

(56) References Cited

U.S. PATENT DOCUMENTS

| | | | |
|---|---|---|---|
| 6,092,200 A | 7/2000 | Muniyappa et al. | |
| 6,192,131 B1 | 2/2001 | Geer et al. | |
| 6,275,941 B1 * | 8/2001 | Saito | G06F 21/33 713/175 |
| 6,292,896 B1 | 9/2001 | Guski et al. | |
| 6,353,886 B1 | 3/2002 | Howard et al. | |
| 6,430,690 B1 | 8/2002 | Vanstone et al. | |
| 6,532,451 B1 | 3/2003 | Schell et al. | |
| 6,775,772 B1 * | 8/2004 | Binding et al. | 713/171 |
| 7,013,389 B1 * | 3/2006 | Srivastava | H04L 9/0822 713/163 |
| 7,065,579 B2 * | 6/2006 | Traversat | G06F 9/4416 709/225 |
| 7,231,517 B1 | 6/2007 | Mashayekhi | |
| 7,254,608 B2 * | 8/2007 | Yeager | H04L 67/104 709/203 |
| 7,299,288 B2 | 11/2007 | Chang et al. | |
| 7,328,243 B2 * | 2/2008 | Yeager | H04L 29/06 707/999.008 |
| 7,360,082 B1 * | 4/2008 | Berthold | H04L 63/0823 713/157 |
| 7,376,827 B1 * | 5/2008 | Jiao | 713/153 |

(Continued)

OTHER PUBLICATIONS

Computer Desktop Encyclopedia definition of "processor": http://lookup.computerlanguage.com/host_app/search?cid=C999999&term=processor&lookup.x=0&lookup.y=0.*

(Continued)

*Primary Examiner* — Jeremiah Avery
(74) *Attorney, Agent, or Firm* — Paul S. Drake

(57) ABSTRACT

A method, system or computer usable program product for managing exchanges of sensitive data including utilizing a processor to request a service across a network from an application, the service requiring a disclosure of a first set of sensitive data by the application; providing a set of certified policy commitments regarding the first set of sensitive data to the application for a determination of acceptability; and upon a positive determination, receiving the service including the disclosure of the first set of sensitive data.

35 Claims, 11 Drawing Sheets

(56) References Cited

U.S. PATENT DOCUMENTS

| | | | |
|---|---|---|---|
| 7,581,095 B2 | 8/2009 | Billhartz | |
| 7,624,441 B2 | 11/2009 | Barkan et al. | |
| 7,783,884 B2* | 8/2010 | Nakano et al. | 713/175 |
| 7,796,751 B2 | 9/2010 | Gentry | |
| 7,813,299 B2 | 10/2010 | Yumoto et al. | |
| 7,853,785 B1 | 12/2010 | Thurman et al. | |
| 7,996,673 B2* | 8/2011 | Ivanov | G06Q 20/383 340/5.8 |
| 8,024,781 B2 | 9/2011 | Saunders et al. | |
| 8,190,675 B2 | 5/2012 | Tribbett | |
| 8,208,900 B2* | 6/2012 | Adler | H04L 63/0272 455/411 |
| 8,281,389 B2 | 10/2012 | Beaver et al. | |
| 8,341,715 B2* | 12/2012 | Sherkin et al. | 726/10 |
| 8,543,816 B2* | 9/2013 | Mercer | G06F 21/606 705/2 |
| 8,621,591 B2* | 12/2013 | Sobel | G06F 21/645 713/156 |
| 8,683,052 B1 | 3/2014 | Brinskelle | |
| 8,688,583 B2* | 4/2014 | Boccon-Gibod et al. | 705/51 |
| 8,843,997 B1* | 9/2014 | Hare | H04L 63/0281 709/200 |
| 8,869,235 B2* | 10/2014 | Qureshi | H04L 63/20 713/150 |
| 8,914,905 B2* | 12/2014 | Okuyama | H04L 63/102 713/156 |
| 9,332,002 B1 | 5/2016 | Bowen | |
| 2002/0029337 A1* | 3/2002 | Sudia | G06Q 20/401 713/176 |
| 2002/0073311 A1 | 6/2002 | Futamura et al. | |
| 2002/0161996 A1* | 10/2002 | Koved | G06F 21/10 713/150 |
| 2002/0178240 A1 | 11/2002 | Fiveash et al. | |
| 2003/0149781 A1 | 8/2003 | Yared et al. | |
| 2003/0182475 A1 | 9/2003 | Gimenez | |
| 2004/0015689 A1* | 1/2004 | Billhartz | 713/156 |
| 2004/0054919 A1* | 3/2004 | Duri | G06F 21/6245 726/1 |
| 2005/0005097 A1 | 1/2005 | Murakawa | |
| 2005/0097327 A1 | 5/2005 | Ondet et al. | |
| 2005/0144463 A1 | 6/2005 | Rossebo et al. | |
| 2008/0016335 A1 | 1/2008 | Takahashi et al. | |
| 2008/0201575 A1* | 8/2008 | van der Rijn | H04L 9/321 713/156 |
| 2009/0099860 A1* | 4/2009 | Karabulut | G06F 21/604 705/325 |
| 2011/0239270 A1 | 9/2011 | Sovio et al. | |
| 2012/0117608 A1 | 5/2012 | Metke et al. | |
| 2012/0221955 A1* | 8/2012 | Raleigh | H04M 15/00 715/736 |
| 2013/0086652 A1* | 4/2013 | Kavantzas | G06F 21/335 726/5 |
| 2013/0305314 A1 | 11/2013 | Niimura | |
| 2014/0013110 A1 | 1/2014 | Thoniel et al. | |

OTHER PUBLICATIONS

Garcia, Diego Zuquim Guimaraes; de Toledo, Maria Beatriz Felgar. A Web Service Architecture Providing QoS Management. LA—Web '06. Pub. Date: 2006. Relevant pp. 189-198. http://ieeexplore.ieee.org/stamp/stamp.jsp?tp=&arnumber=4022109.*

Hamada, Takeo. Dynamic Role Creation from Role Class Hierarchy—Security Management of Service Session in Dynamic Service Environment. Proceedings, TINA 97. Pub. Date: 1997. Relevant pp. 152-163. http://ieeexplore.ieee.org/stamp/stamp.jsp?tp=&arnumber=660720.*

She, Wei; Yen, I-Ling; Thuraisingham, Bhavani. Enhancing Security Modeling for Web Services using Delegationi and Pass-on. IEEE International Conference on Web Services, 2008. ICWS '08. http://ieeexplore.ieee.org/stamp/stamp.jsp?tp=&arnumber=4670219.*

Pfeiffer, Stefan; Unger, Sebastian; Timmermann, Dirk; Lehmann, Andreas. Secure Information Flow Awareness for Smart Wireless eHealth Systems. 2012 9th International Multi-Conference on Systems, Signals and Devices (SSD). http://ieeexplore.ieee.org/stamp/stamp.jsp?arnumber=6198123.*

Steele, Robert; Min, Kyongho. Role-Based Access to Portable Personal Health Records. 2009 International Conference on Management and Service Science. MASS '09. http://ieeexplore.ieee.org/stamp/stamp.jsp?arnumber=5301451.*

"X.509", Wikipedia.com, Jan. 9, 2012, found on the world wide web at: http://web.archive.org/web/20120109190205/http://en.wikipedia.org/wiki/X.509.

"XML", Wikipedia.com, Mar. 5, 2012, found on the world wide web at: http://web.archive.org/web/20120305170157/https://en.wikipedia.org/wiki/Xml.

"Cython", Wikipedia.com, Dec 10, 2011, found on the world wide web at: http://web.archive.org/web/20111210144342/http://en.wikipedia.org/wiki/Cython.

Computer Desktop Encyclopedia definition of "processor", found on the world wide web at: http://lookup.computerlanguage.com/host_app/search?cid=C999999&term=processor&lookup.x=0&lookup.y=0, Pub. Date: 2014.

Garcia, Diego Zuquim Guimaraes; de Toledo, Maria Beatriz Felgar; "A Web Service Architecture Providing QoS Management", LA—Web '06, Pub. Date: 2006, pp. 189-198, http://ieeexplore.ieee.org/stamp/stamp.jsp?tp=&arnumber=4022109.

Hamada, Takeo, "Dynamic Role Creation from Roll Class Hierarchy—Security Management of Service Session in Dynamic Service Environment", TINA 97, Pub. Date: 1997, pp. 152-163, http://ieeexplore.ieee.org/stamp/stamp.jsp?tp=&arnumber=660720.

* cited by examiner

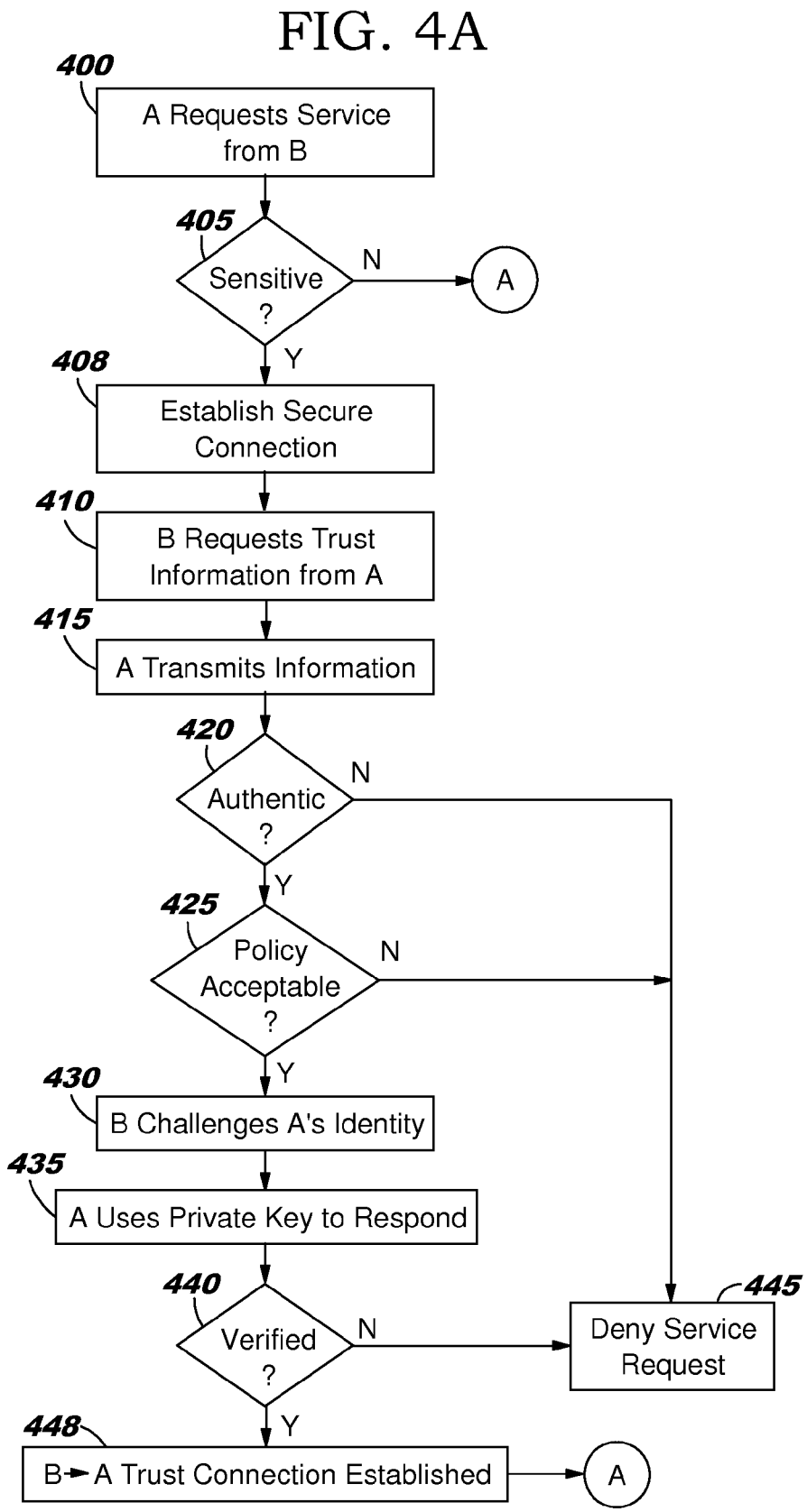

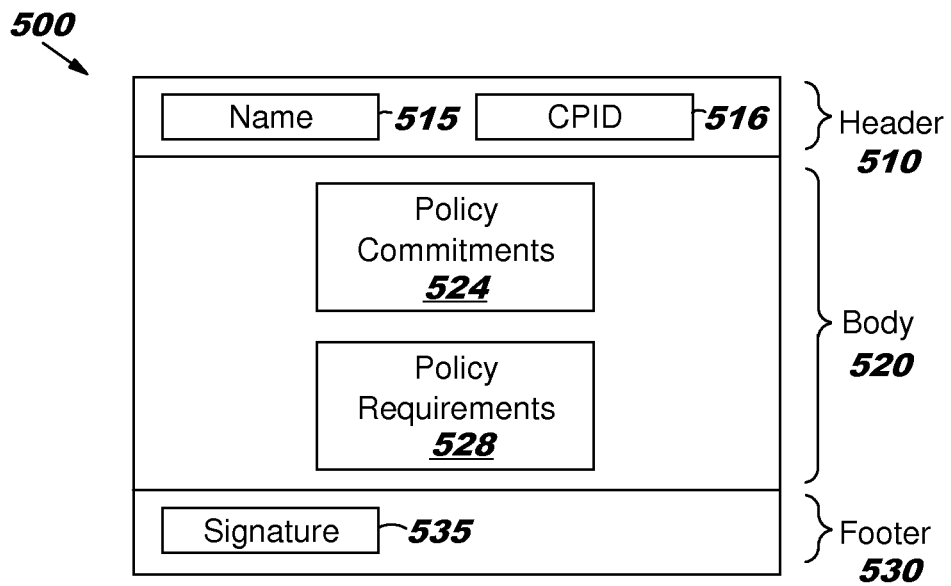

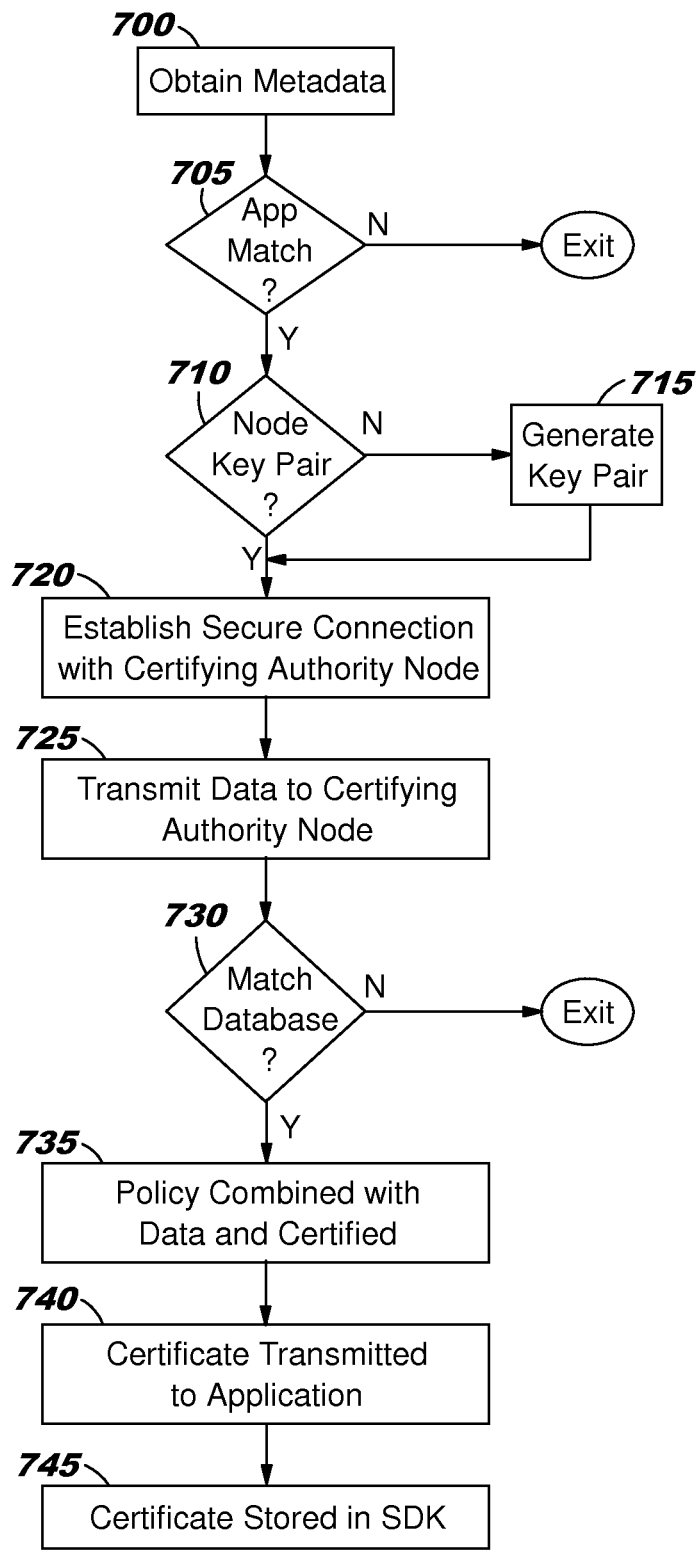

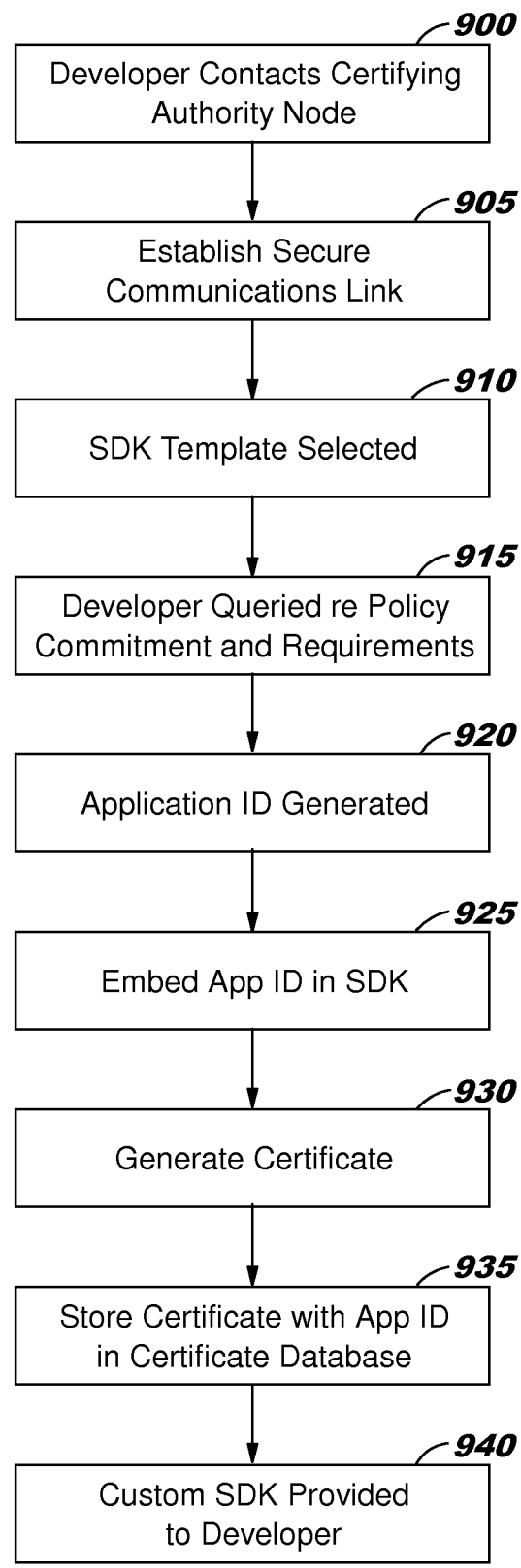

MANAGING EXCHANGES OF SENSITIVE DATA

This application is copending with concurrently filed application Ser. No. 13/841,777 of Daniel Guinan, filed on Mar. 15, 2013, entitled "MANAGING DATA HANDLING POLICIES"; with concurrently filed application Ser. No. 13/842,580 of Daniel Guinan, filed on Mar. 15, 2013, entitled "MANAGING DATA HANDLING POLICIES"; and with concurrently filed application Ser. No. 13/842,756 of Daniel Guinan, filed on Mar. 15, 2013, entitled "MANAGING DATA HANDLING POLICIES"; the disclosure of each of the foregoing which is incorporated in its entirety herein by reference.

BACKGROUND

1. Technical Field

The present invention relates generally to managing exchanges of sensitive data, and in particular, to a computer implemented method for managing exchanges of sensitive data between applications of multiple nodes.

2. Description of Related Art

The secure exchange of information in the age of the internet is an ongoing issue. Internet security can include browser security and network security as that applies to operating systems and applications. Many technologies have been utilized including passwords, biometrics, encryption, and authentication such as with the use of public and private keys. Various communication protocols have been utilized including transmission control protocol and internet protocol (TCP/IP) and a secure socket layer (SSL). Various languages have also been utilized that can take advantage of the foregoing including hypertext markup language (HTML), extensible markup language (XML) and more recently LXML which binds certain XML with certain libraries through an application program interface.

SUMMARY

The illustrative embodiments provide a method, system, and computer usable program product for managing exchanges of sensitive data including utilizing a processor to request a service across a network from an application, the service requiring a disclosure of a first set of sensitive data by the application; providing a set of certified policy commitments regarding the first set of sensitive data to the application for a determination of acceptability; and upon a positive determination, receiving the service including the disclosure of the first set of sensitive data.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 4A and 4B are a flow diagram of the operation of a node application exchanging certificates and data with another node in which various embodiments may be implemented;

FIGS. 5A and 5B are block diagrams of a certified policy and a policy library in which various embodiments may be implemented;

FIG. 7 is a flow diagram of the operation of a node application registering with a certifying authority node in which various embodiments may be implemented;

FIG. 9 is a flow diagram of an application developer establishing a policy and generating a custom SDK for an application being developed in which various embodiments may be implemented.

DETAILED DESCRIPTION

Processes and devices may be implemented and utilized to manage exchanges of sensitive data. These processes and apparatuses may be implemented and utilized as will be explained with reference to the various embodiments below.

Figure 1:
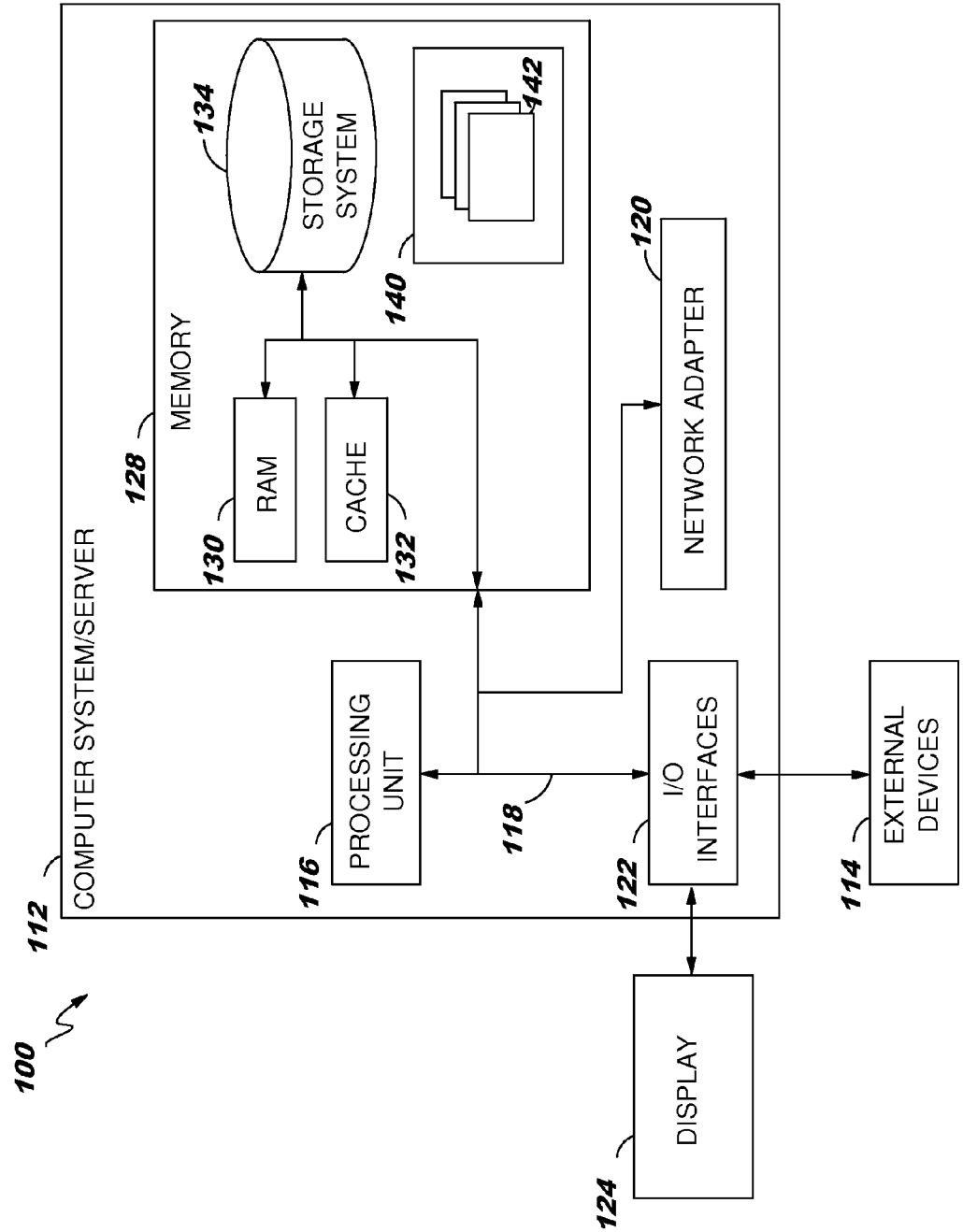
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing exchanges of sensitive data.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
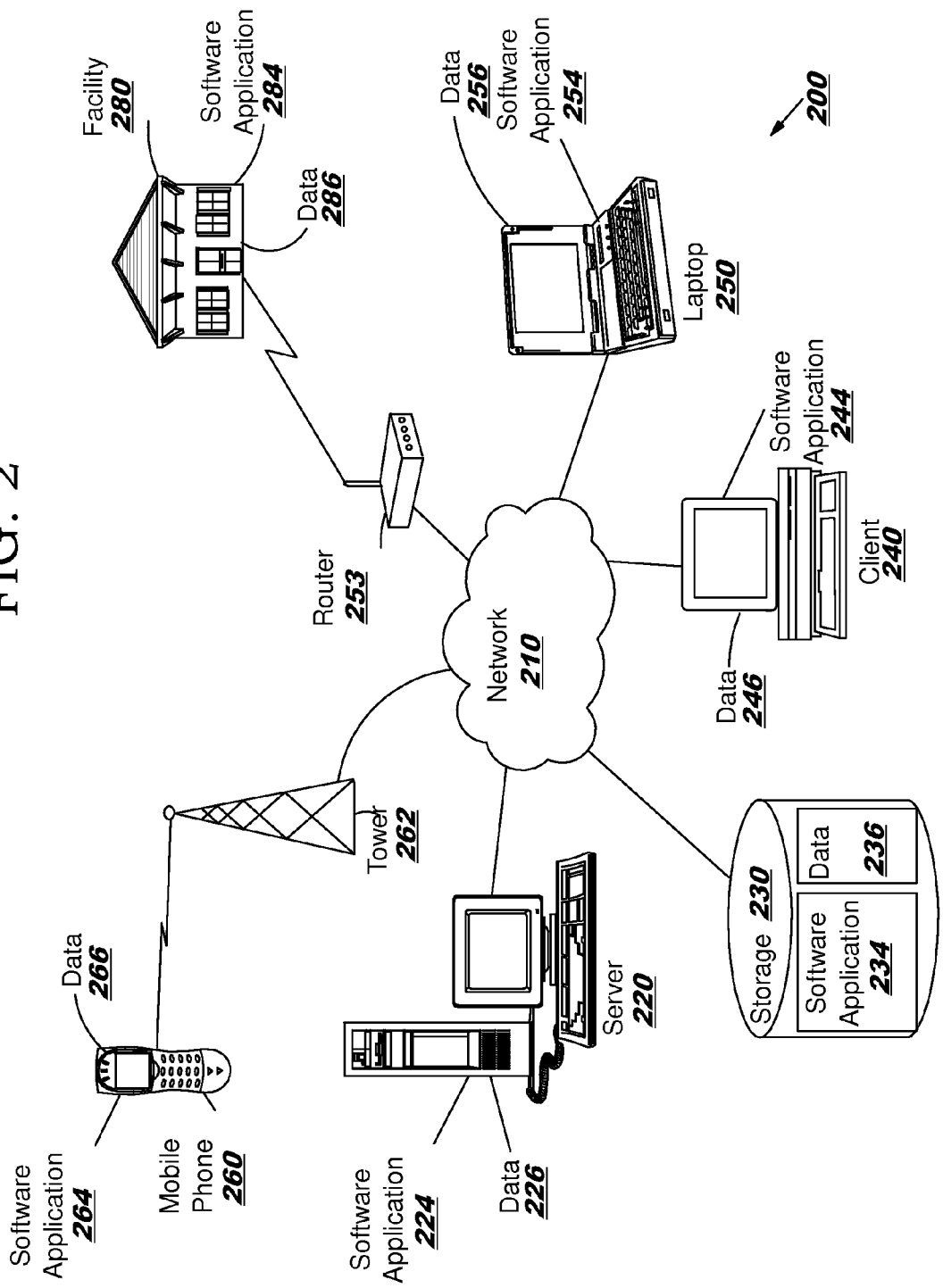
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing exchanges of sensitive data or other software applications and data in accordance with embodiments described herein. Storage 230 may contain software application 234 and a content source such as data 236 for managing exchanges of sensitive data. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for managing exchanges of sensitive data.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
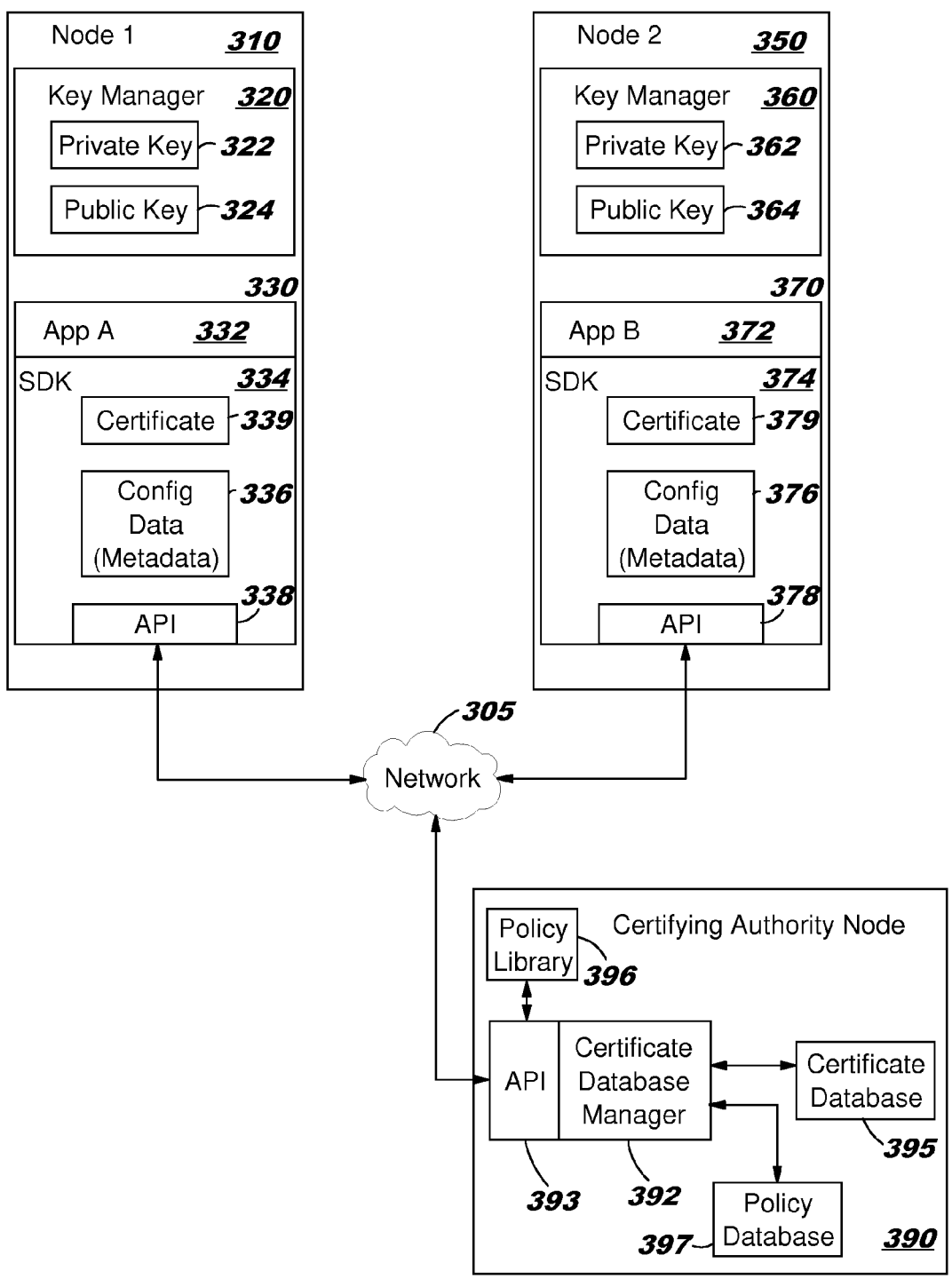
FIG. 3 is a block diagram of applications managing exchanges of sensitive data in which various embodiments may be implemented.

FIG. 3 is a block diagram of applications managing exchanges of sensitive data in which various embodiments may be implemented. In this example, two nodes are shown with applications exchanging sensitive data under certain conditions, referred to herein as policies, with the assistance of a certifying authority node. A node may be a data processing system, a group of data processing systems working together, or a portion of a data processing system such as a virtual machine. Each node may include sensitive data which may be handled in accordance with certain policies.

A set of nodes 300 includes a node 1 (N1) 310, a node 2 (N2) 350 and a certifying authority node 390. These nodes are in communication with each other such as across a network or the internet 305. Node 1 may be a mobile device such as a mobile phone or tablet, or it may be a fixed location device such as a personal computer or server. Node 2 may be a service or other device that can provide services or provide information for node 1. Certifying authority node 390 may be utilized for enabling the trusted communications of sensitive information between node 1 and node 2. For illustrative purposes, node 1 will be described as a mobile device and node 2 will be described as a service provider in this example, although many other types of nodes may utilize the elements described herein and alternatives thereto.

Node 1 includes a key manager 320 and an application A 330. Node 1 may include multiple applications such as described below. Key manager 320 includes a private key 322 and a public key 324. Private key 322 is maintained within node 1 and is not shared with other nodes. Public key 324 is maintained within node 1 and may be shared with other nodes. Public key 324 may also be a mutable identifier for node 1. Private key 322 and public key 324 may be obtained during a registration process as described below and may be shared among multiple applications on node 1.

Node 1 also includes Application A 330. Application A includes a set of software 332 for performing tasks and a set of SDK (software development kit) software 334 which is utilized for communicating with other nodes. SDK 334 may be obtained from a third party developer such as certifying authority node 390 and may be embedded in application 330 during the development of that application. Alternatively, SDK may be open source software or other commonly known or utilized software for enabling common communications between applications and a certifying authority node. SDK 334 includes configuration data 336 (also referred to as metadata) and API (application program interface) 338. Configuration data 336 includes a variety of configuration information such as an application identifier that identifies the type of application, a company name of the developer or distributor of the application, a version number that identifies the version of the application, etc. API 338 is a common interface that may be utilized for communicating with other applications either within node 1 or with other nodes such as node 2 and with the certifying authority node. SDK 334 may also include a certificate 339 that is loaded into the SDK when the application is first used or when it registers with the certifying authority node or other registration authority. Certificate 339 may also be referred to herein as a certified policy.

Node 2 includes a key manager 360 and an application B 370. Node 2 may include multiple applications such as described below. Key manager 360 includes a private key 362 and a public key 364. Private key 362 is maintained within node 2 and is not shared with other nodes. Public key 364 is maintained within node 2 and may be shared with other nodes. Public key 364 may also be a mutable identifier for node 2. Private key 362 and public key 364 may be obtained during a registration process as described below and may be shared among multiple applications on node 1.

Node 2 also includes Application B 370. Application B includes a set of software 372 for performing tasks and a set of SDK (software development kit) software 374 which is utilized for communicating with other nodes. SDK 374 may be obtained from a third party developer such as certifying authority node 390 and may be embedded in application 370 during the development of that application. Alternatively, SDK may be open source software or other commonly known or utilized software for enabling common communications between applications and a certifying authority node. SDK 374 includes configuration data 376 (also referred to as metadata) and API (application program interface) 378. Configuration data 376 includes a variety of configuration information such as an application identifier that identifies the type of application, a company name of the developer or distributor of the application, a version number that identifies the version of the application, etc. API 378 is a common interface that may be utilized for communicating with other applications either within node 2 or with other nodes such as node 1 and with the certifying authority node. SDK 374 may also include a certificate 379 that is loaded into the SDK when the application is first used or when it registers with the certifying authority node or other registration authority. Certificate 379 may also be referred to herein as a certified policy.

Certifying authority node 390 includes a certificate database manager 392 with an API 393 that accesses a certificate database 395. The certificate database includes certificates generated during a registration process as described below and allows other nodes to access those certificates as needed for enabling trusted exchanges of information. Certifying authority node 390 may also include a policy library 396 for access by developers when generating certified policies for their applications or for use during the registration process as described below. Those policies generated by developers may be stored in a policy database utilized during an application registration process discussed below with reference to FIG. 6.

Figure 4B:
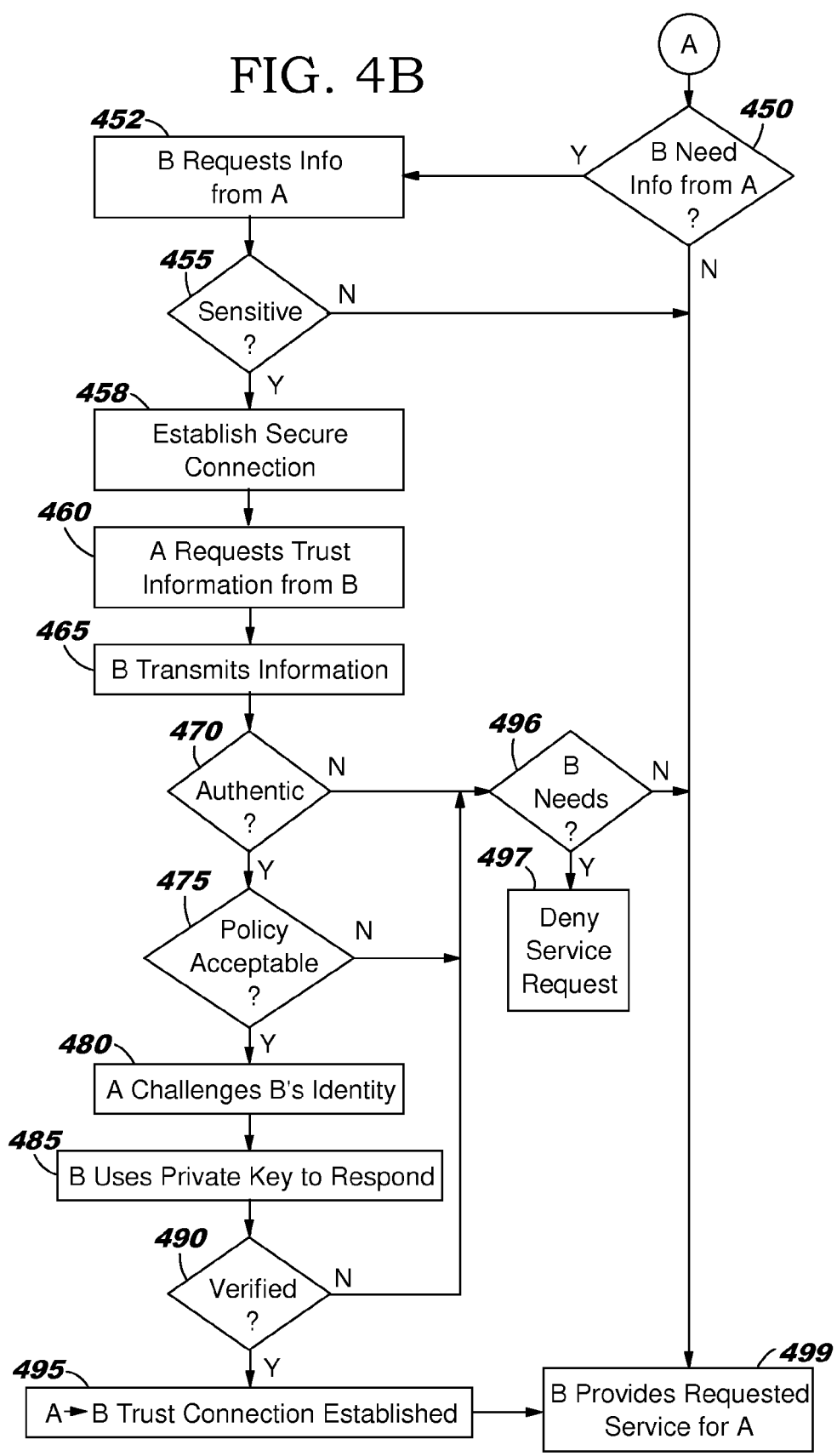

FIGS. 4A and 4B are a flow diagram 400 of the operation of a node application exchanging certificates and data with another node in which various embodiments may be implemented. For illustrative purposes, node 1 will be described as a mobile device such as a cell phone with application A and node 2 will be described as a service provider such as a server with application B in this example, although many other types of nodes and applications may utilize the elements described herein and alternatives thereto.

In a first step 400, application A of node 1 requests a service of application B of node 2. For example, application A may be a mapping application on a mobile phone that requests information from a central server about a certain location or businesses at a certain location. In subsequent step 405, application B determines whether the requested information is sensitive and requires certain security or privacy protections. That is, the information may be confidential or private and require certain security and or privacy commitments before being disclosed to another node. For example, if the information included certain medical information of a patient, that information needs to be carefully protected. If yes, then processing continues to step 408, otherwise processing continues to step 450 of FIG. 4B.

In step 408, application A and application B establish a secure connection (e.g. SSL). Then in step 410, application B requests trust information from A. In step 415, application A then transmits a copy of the trust information including the application A certificate, the node 1 public key, and the application A configuration data including the application A identifier. Alternatively, application B can obtain the application A certificate from certifying authority node using the application A identifier. Upon receiving the trust information from A, application B then authenticates the application A certificate in step 420. As described below with reference to FIGS. 6A and 6B, a hash of the application A certificate (certified policy) has been encrypted with the private key of the certifying authority node thereby generating a certifying authority signature. Application B can then authenticate the certified policy by verifying that the certified policy is genuine and has not been modified. This authentication can be accomplished by hashing the certified policy, decrypting the signature using the certifying authority node public key, and comparing the results. In addition, application B can compare the name of the application in the certified policy to the name acquired above when establishing the secure communications, thereby verifying application A is providing the correct certified policy and not the policy of a third party. In an alternative embodiment, certificate chaining analysis can be performed to authenticate the certified policy. That is, application B looks at the certified policy of application A and authenticates that node 1 owns the key associated with that policy, and then looks at a list of trusted keys (certificates) stored in the node 2 SDK to ensure that the chain of signers between what it trusts and the signer of that policy is transitively trusted. If the certified policy is authenticated, then processing continues to step 425, otherwise processing continues to step 445 where the service request is denied.

In step 425, the application A policy commitments are compared to the application B policy requirements. This is to determine whether the application A policy commitments meet or exceed the application B policy requirements. If there are contradictions where the application A policy commitments do not meet or exceed the application B policy requirements, then application B may not share data with application A as the appropriate data handling protections are not in place at application A. This comparison may be accomplished mathematically, which may be simplified by using a common hierarchically based policy library as described with relation to FIG. 5B. That is, the policy requirements and policy commitments may each include a set of references to the policy library. Each of the references in the application B policy requirements must correspond to a reference in the application A policy commitments. As a result, in step 425, it is determined whether the application A policy is acceptable (non-contradictory) to application B. If yes, then processing continues to step 430. If not, then processing continues to step 445 where the service request is denied.

In step 430, application B challenges the identity of application A and node 1. This can involve application B challenging application a to solve a problem with the private key stored in node 1 that is associated with a public key contained in the certified policy. If the application A and node 1 identity is authenticated, then processing continues to step 448, otherwise processing continues to step 445 where the service request is denied. Alternative embodiments may utilize alternative means for one application to verify the identity of the other application. In step 448, a trust connection has now been established where application B can trust sensitive information with application A on node 1. Processing then continues to step 450 of FIG. 4B.

In step 450, application B determines whether it needs information from application A in order to perform the requested service. If not, then processing continues to step 499 where the requested service is performed. If such information is needed, then in step 450, application B of node 2 requests that needed information from application A of node 1. For example, application B may be a mapping service requesting the current location of node 1. In subsequent step 455, application A determines whether the requested information is sensitive and requires certain security or privacy protections. If yes, then processing continues to step 458, otherwise the requested information is provided and processing continues to step 499 where the requested service is performed.

In step 458, application A and application B establish a secure connection (e.g. SSL) if such a connection was not previously established in step 408 above. Then in step 460, application A requests trust information from B. In step 415, application B then transmits a copy of the trust information including the application B certificate, the node 2 public key, and the application B configuration data including the application B identifier. Alternatively, application A can obtain the application B certificate from certifying authority node using the application B identifier. Upon receiving the trust information from B, application A then authenticates the application B certificate in step 470. A hash of the application A certificate (certified policy) has been encrypted with the private key of the certifying authority node thereby generating a certifying authority signature. Application B can then authenticate the certified policy by verifying that the certified policy is genuine and has not been modified. This authentication can be accomplished by hashing the certified policy, decrypting the signature using the certifying authority node public key, and comparing the results. In addition, application A can compare the name of the application in the certified policy to the name acquired above when establishing the secure communications, thereby verifying application B is providing the correct certified policy and not the policy of a third party. In an alternative embodiment, certificate chaining analysis can be performed to authenticate the certified policy. That is, application A looks at the certified policy of application B and authenticates that node 2 owns the key associated with that policy, and then looks at a list of trusted keys (certificates) stored in the node 1 SDK to ensure that the chain of signers between what it trusts and the signer of that policy is transitively trusted. If the certified policy is authenticated, then processing continues to step 475, otherwise processing continues to step 496.

In step 475, the application B policy commitments are compared to the application A policy requirements. This is to determine whether the application B policy commitments meet or exceed the application A policy requirements. If there are contradictions where the application B policy commitments do not meet or exceed the application A policy requirements, then application A may not share data with application B as the appropriate data handling protections are not in place at application B. This comparison may be accomplished mathematically. That is, the policy requirements and policy commitments may each include a set of references to the policy library. Each of the references in the application A policy requirements must correspond to a reference in the application B policy commitments. As a result, in step 475, it is determined whether the application B policy is acceptable (non-contradictory) to application A. If yes, then processing continues to step 480. If not, then processing continues to step 496.

In step 480, application A challenges the identity of application B and node 2. This can involve application A challenging application B to solve a problem with the private key stored in node 2 that is associated with a public key contained in the certified policy. If the application B and node 2 identities are authenticated, then processing continues to step 495, otherwise processing continues to step 496. In step 495, a trust connection has now been established where application A can trust sensitive information with application B on node 2.

In step 496 where A cannot trust B with the requested information, application B determines whether the service cannot be provided without the requested information. If yes, then in step 497 the service request is denied, otherwise processing continues to step 499 where B provides the requested service for A.

FIG. 5A is a block diagram of a certified policy in which various embodiments may be implemented. A certified policy 500 (also referred to herein as a certificate) is composed of three sections, a header 510, a body 520 and footer 530. The header can include a variety of information including an official name 515 of the node (entity or person) owning the certified policy and a certified policy identifier (CPID) 516. The official name 515 is useful in authenticating the entity of the certified policy with the entity identified during the exchange of certificates in establishing secure communications as described below with reference to FIG. 6B. The certificate policy identifier 516 may be useful for storage with any data received or provided pursuant to the certified policy. The CPID may also be useful in quickly obtaining another copy of the certified policy if needed in the future.

The body can include a set of policy commitments 524. These are data handling policies that the node commits to apply to third party information obtained by the owner. These policy commitments may be identified through a process described below with reference to FIG. 6B. In addition, the policy requirements 528 of the node may also be included in the certified policy. However, in an alternative embodiment the policy requirements may not be included or may not be included in the digital signature as described below. The footer can also include a variety of information such as a digital signature 535. The digital signature may be generated by a certifying authority by hashing header 510 and body 520 and then encrypting that hash using the certifying authority private key. The certified policy can then be authenticated by similarly hashing the header and body of the certified policy, decrypting digital signature 535 using the certifying body public token, and comparing the results. If the certified policy header and footer have not been modified, then the hash results should match the decrypted digital signature, thereby authenticating the certified policy. In addition, name 515 should match the name of the node providing the certified policy.

FIG. 5B is a block diagram of a policy library which may be utilized to generate policies in which various embodiments may be implemented. Policy library 550 includes multiple entries, each entry including a reference number 560 and a description 570. The entries are generally presented in groups 580 and 585 (also referred to herein as sets of entries or policies) and within a hierarchical order within each group. That is, the entry with the lowest reference number within a group is the least restrictive and the entry with the highest number is the most restrictive. The group of entries starting with the number 01 includes general policies to be applied across all data types. The group of entries starting with the number 08 includes specific policies to be applied only to social security numbers in this example. For example, entry 0101 is less restrictive or protective of data than entry 0102 or 0103. Many other groups of entries may be generated that apply to other data types, sources of data, etc. by utilizing other starting reference numbers. This approach works well where each group of entries can be ordered sequentially by restrictiveness. For more complex hierarchical arrangements, a separate tree structure may be utilized to accompany the policy library. The tree structure could include a hierarchical ranking of the entries relative to each other in a non-linear fashion. That tree structure could be utilized as a look up table to determine the relative ranking of each policy in terms of restrictiveness. Alternative embodiments may utilize alternative policy structures such as tokens that are machine readable or encoded so that a processor can automatically compare various policies.

Figure 6A:
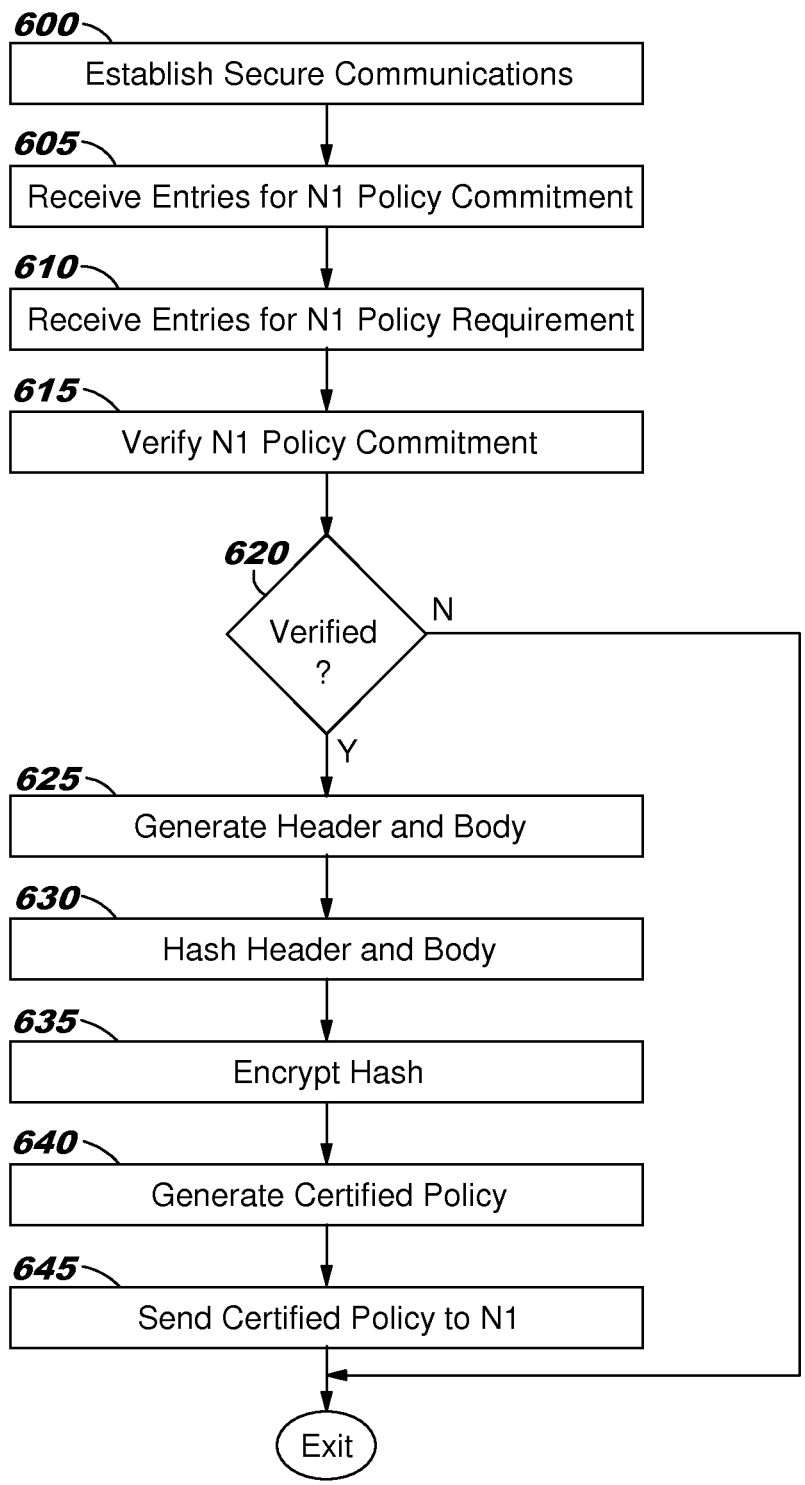
FIGS. 6A and 6B are flow diagrams of a creation and an authentication of a certified policy in which various embodiments may be implemented.

FIG. 6A is a flow diagram of a creation of a certified policy in which various embodiments may be implemented. This flow diagram is from the perspective of the certifying authority that is contacted by Node 1 (N1) to generate a certified policy but could similarly be shown from the perspective of node 2 (N2). In a first step 600, secure communications are established between the certifying authority node and N1. This includes obtaining the official name of Node 1 through the exchange of certificates in establishing secure communications. In a second step 605, the certifying authority receives the entries (i.e. policies) for the N1 policy commitment. This can be accomplished through a graphical user interface where a Node 1 representative can select the desired entries from the certifying authority policy library. Alternative embodiments may utilize alternative approaches to provide these policies. In a third step 610, the certifying authority receives the entries (i.e. policies) for the N1 policy requirement. This can also be accomplished through a graphical user interface where a Node 1 representative can select the desired entries from the certifying authority policy library or through alternative methods such as an automated interface between N1 and the certifying authority node.

Subsequently in step 615, the certifying authority verifies the N1 policy commitment. This can include verifying that the N1 policy requirement will sufficiently maintain the N1 policy commitment. This can also include various steps of verifying the veracity of Node 1 such as by contacting third parties and by reviewing prior activity of Node 1. In step 620, it is determined whether the N1 policy is verified. If not, then processing ceases, otherwise processing continues to step 625.

In step 625, the header and body of the N1 certified policy are generated. The header includes the official name of Node 1 that was identified in step 600 above and a unique certified policy identifier (CPID). The CPID may be used by parties for identifying this policy in the future. The body includes the N1 policy commitments and may include the N1 policy requirements. Subsequently in steps 630 and 635, the header and body are hashed and the resulting hash is encrypted with the certifying authority private key. The encrypted hash is then added to the N1 certified policy as a digital signature in step 640, thereby completing the certified policy, also referred to herein as a certificate. The completed certified policy is then sent to N1 is step 645.

In an alternative embodiment, the policy commitments may be included in the hash and encryption process of generating a digital signature, but the policy requirements may or may not be included in the process of generating the digital signature. That is, the commitments are certified and as such are non-repudiable, but the requirements may not be certified.

Figure 6B:
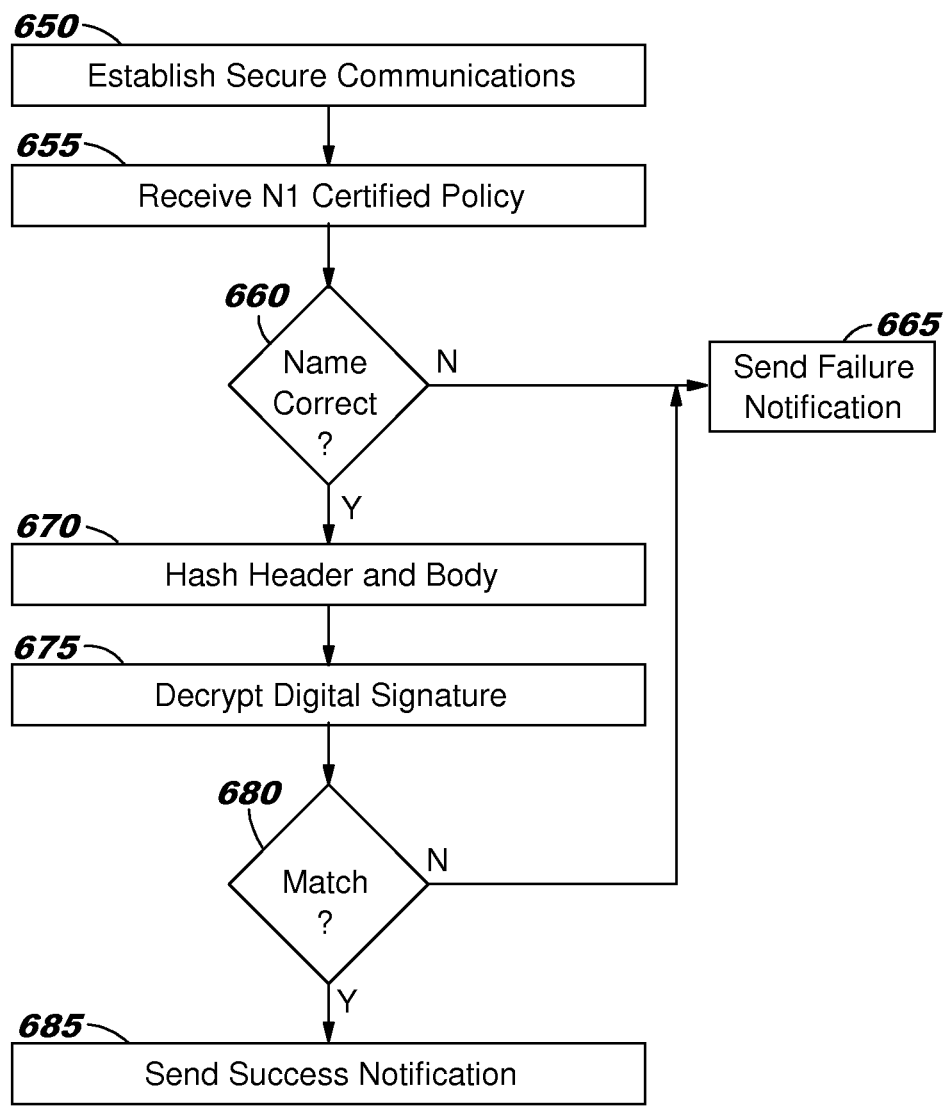

FIG. 6B is a flow diagram of an authentication of a certified policy (i.e. certificate) in which various embodiments may be implemented. This flow diagram is from the perspective of a Node 2 (N2) that has received a certified policy from Node 1 (N1), but could similarly be shown from the perspective of node 2 (N2) receiving a certified policy from N1 or other node. In a first step 650 secure communications are established between N2 and N1. This includes obtaining the official name of N1 through the exchange of other types of node certificates in establishing secure communications. In a second step 655, N2 receives the N1 certified policy as part of the process described above with reference to FIGS. 4A and 4B. Subsequently in step 660 N2 determines whether the name in the certified policy header matches the name obtained in step 650 above. If not, then a failure notification is sent on step 665 and processing ceases, otherwise processing continues to step 670. In step 670, N2 hashes the header and body of the N1 certified policy. N2 then decrypts the digital signature using the certifying authority public key in step 675. If N1 does not already have the certifying authority public key, it can be obtained directly from the certifying authority. Subsequently in step 680, it is determined whether the calculated hash matches the decrypted digital signature. If not, then a failure notification is sent on step 665 and processing ceases.

Alternative embodiments may be utilized to create and authenticate certified policies including the use of certified exceptions to the certificated commitments and/or requirements. That is, the nodes negotiating commitments and requirements can agree to certain exceptions that can then be certified by the certifying authority node.

FIG. 7 is a flow diagram of the operation of a node application registering with a certifying authority node in which various embodiments may be implemented. An application may register when it is initially downloaded to a node such as a mobile phone, or it may register when the application is first utilized by the user or the node. The purpose of the registration is multipurpose including downloading the application certificate to the application and linking that certificate to the node. For illustrative purposes, application A of node 1 as shown in FIG. 3 is being registered with the certifying authority node.

In a first step 700, application A obtains the configuration data (metadata) from the SDK that was loaded into the application by the developer when the application was developed. This includes information such as the company name (of the developer), the application identifier, and the application version. Additional information may be included. Then in step 705, the SDK may then interrogate the application to ensure the configuration data matches the application that is trying to utilize that data. If not, then registration fails and processing ceases. Otherwise processing continues to step 710. The application then queries the node in step 710 to determine whether a public private key pair exists for that node for use by applications. If not, then a new cryptographic key pair is generated for that purpose in step 715. Processing then continues to step 720.

In step 720 a secure connection (e.g. SSL) is established between Node 1 and the certifying authority node. Then in step 725, the application configuration data and the node 1 public key are transmitted to the certifying authority node. In step 730, the certifying authority node looks at its policy database to determine whether there is a matching policy established by the developer for the type of application registering. If not, then processing ceases, otherwise processing continues to step 735. In step 735, then the policy is augmented with the application configuration data (metadata) and the node 1 public key to generate a certificate that is signed by the certifying authority node with its private key. This certificate is then a node 1 specific certificate for the application that includes the policies set forth by the developer of the application. This certificate is then stored in the certifying authority certificate database and transmitted to the application A SDK in step 740. The certificate is then stored in the SDK by application A for use in establishing trust connections with other applications.

Figure 8:
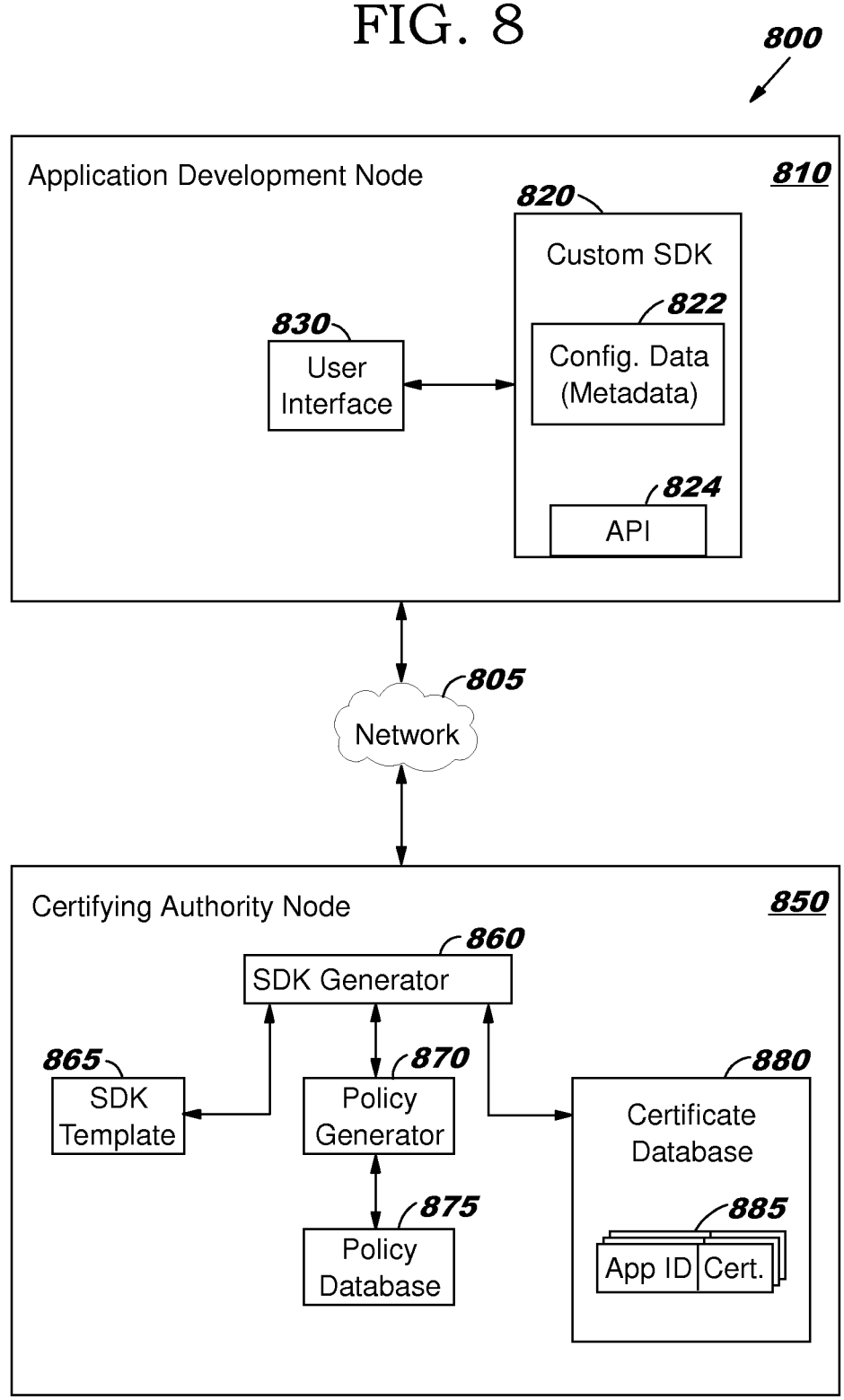
FIG. 8 is a block diagram of an application developer establishing a policy and generating a custom SDK for an application being developed in which various embodiments may be implemented.

FIG. 8 is a block diagram of an application developer establishing a policy and generating a custom SDK for an application being developed in which various embodiments may be implemented. A set of nodes 800 including an application development node 810 and a certifying authority node 850 communicate with each other across a network 805 such as the internet. Application development node desires to obtain a custom SDK (software development kit) 820 for an application being developed and a user interface 830 for communicating with the developer. The custom SDK should have a set of configuration data (also referred to as metadata) 822 and a standard API (application program interface) 824. Configuration data 822 can include a variety of configuration information such as an application identifier that identifies the type of application, a company name of the developer or distributor of the application, a version number that identifies the version of the application, etc. API 338 is a common interface that may be utilized for communicating with other applications either within node 1 or with other nodes such as node 2 and with the certifying authority node. The application development node obtains this custom SDK from certifying authority node 850 in the process described in FIG. 9 below.

Certifying authority node 850 can include an SDK generator 860, and SDK template 865, a policy generator 870, a policy database 875 and a certificate database 880 containing certain configuration information 885. SDK generator 860 starts with SDK template 865 to build the custom SDK. SDK generator then communicates with policy generator 870 to generate a policy for the application with input from application development node 810. SDK generator 860 then stores certain results of the SDK generation process in certificate database 880.

FIG. 9 is a flow diagram of an application developer establishing a policy and generating a custom SDK for an application being developed in which various embodiments may be implemented. In a first step 900, a developer through a communication node (referred to herein as an application development node) may contact a certifying authority node requesting a policy and custom SDK. In a second step 905, a secure communication link such as SSL (secure sockets layer) is established between the application development node and the certifying authority node. In a third step 910, the SDK generator selects an SDK template to build the custom SDK and to initiate the process of establishing a certified policy. There may be multiple templates and the one selected may require certain inquiries to the application development node with the developer through a user interface.

Subsequently in step 915, the developer is queried by the policy generator through the SDK generator and the user interface in the application development node. These queries are to determine the policy commitments and any policy requirements that the developer prefers apply to the application. For example, if the developer is developing a mapping program, the developer may require certain information such as the location of a person requesting service from the application and the developer may be willing to provide certain security and privacy guarantees regarding that location information. The policy generator utilizes the policy database to establish these queries. Alternatively, the policy database may simply be provided to the developer for that developer to pick and choose.

Once the policy commitments and requirements are established, then an application identifier may be generated in step 920. That application identifier is then embedded in the configuration data of the custom SDK in step 925. Then in step 930, the policy commitments and requirements are used to generate a certified policy (also referred to as a certificate). That certificate is then stored in the certificate database with the application identifier in step 935. The custom SDK is then provided to the application development node in step 940.

In an alternative embodiment, the custom SDK with an application ID may be provided to the developer prior to establishing the policy requirements and commitments. At a later stage of development, the developer can return to the certifying authority node to generate the certificate, which is then stored with the application identifier in the certificate database.

The invention can take the form of an entirely software embodiment, or an embodiment containing both hardware and software elements. In a preferred embodiment, the embodiments are implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing exchanges of sensitive data. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing exchanges of sensitive data comprising:
    establishing a secure connection between a first application and a second application across a network;
    the first application utilizing a processing device to request a service across the network from the second application utilizing a separate processing device, the service requiring a disclosure of a first set of sensitive data by the second application;
    responsive to the second application requesting a set of certified policy commitments of the first application in response to the service request, providing across the network the set of certified policy commitments of the first application regarding the first set of sensitive data to the second application for authentication of the set of certified policy commitments and for a determination of acceptability of data handling policies included in the set of certified policy commitments, wherein the set of certified policy commitments provided by the first application includes data handling policies that the first application commits to utilize in handling and protecting the set of sensitive data of the second application; and
    upon a positive authentication of the set of certified policy commitments and a positive determination of acceptability of the included data handling policies by the second application, receiving the service including the disclosure of the first set of sensitive data from the second application through the secure connection;
    wherein the first set of sensitive data can be provided by the second application to the first application pursuant to the set of certified policy commitments provided by the first application if the second application determines that the included data handling policies satisfy a set of predetermined policy requirements of the second application.

2. The method of claim 1 wherein the first application is located at a first node and a first node identifier is provided with the set of certified policy commitments.

3. The method of claim 2 wherein the first node identifier is stored in a memory and wherein multiple applications commonly share the first node identifier.

4. The method of claim 2 wherein the first node identifier is a public key.

5. The method of claim 4 further comprising receiving a challenge from the second application whereby a response is provided using a private key corresponding to the public key.

6. The method of claim 1 further comprising receiving a request from the second application to disclose a second set of sensitive data by the first application to the second application; the first application requesting a second set of certified policy commitments from the second application; comparing the second set of certified policy commitments to a second set of predetermined set of policy requirements of the first application to determine acceptability; and upon a positive determination of acceptability of the second set of certified policy commitments, providing the second set of sensitive data to the second application.

7. The method of claim 6 wherein the set of certified policy commitments and the second set of certified commitments can be authenticated by utilizing a public key of a certifying authority.

8. The method of claim 1 wherein the first set of policy commitments and the predetermined set of policy requirements are selected by a developer of the first application from a standard set of policies.

9. The method of claim 6 wherein the second application is located at a second node and a second node identifier is provided with the set of certified policy commitments.

10. The method of claim 9 wherein the second node identifier is utilized to verify the authenticity of the second node.

11. The method of claim 6 wherein the first node identifier is provided to the second application with the second set of certified policy commitments for verification of identity.

12. The method of claim 11 wherein a first node identifier is provided with the set of certified policy commitments; wherein the first node identifier is stored in a memory and wherein multiple applications commonly share the first node identifier; wherein the first node identifier is a public key; wherein the set of certified policy commitments and the second set of certified commitments can be authenticated by utilizing a public key of a certifying authority; wherein the second set of policy commitments and the predetermined set of policy requirements are selected from a standard set of policies; wherein the second application is located at a second node and a second node identifier is provided with the set of certified policy commitments; and wherein the second node identifier is utilized to verify the authenticity of the second node.

13. A computer usable program product comprising a non-transitory computer usable storage medium including computer usable code for use in managing exchanges of sensitive data, the computer usable program product comprising code for performing the steps of:
 establishing a secure connection between a first application and a second application across a network;
 the first application utilizing a processing device to request a service across the network from the second application utilizing a separate processing device, the service requiring a disclosure of a first set of sensitive data by the second application;
 responsive to the second application requesting a set of certified policy commitments of the first application in response to the service request, providing across the network the set of certified policy commitments of the first application regarding the first set of sensitive data to the second application for authentication of the set of certified policy commitments and for a determination of acceptability of data handling policies included in the set of certified policy commitments, wherein the set of certified policy commitments provided by the first application includes data handling policies that the first application commits to utilize in handling and protecting the set of sensitive data of the second application; and
 upon a positive authentication of the set of certified policy commitments and a positive determination of acceptability of the included data handling policies by the second application, receiving the service including the disclosure of the first set of sensitive data from the second application through the secure connection;
 wherein the first set of sensitive data can be provided by the second application to the first application pursuant to the set of certified policy commitments provided by the first application if the second application determines that the included data handling policies satisfy a set of predetermined policy requirements of the second application.

14. The computer usable program product of claim 13 wherein the first application is located at a first node and a first node identifier is provided with the set of certified policy commitments.

15. The computer usable program product of claim 14 wherein the first node identifier is stored in a memory and wherein multiple applications commonly share the first node identifier.

16. The computer usable program product of claim 14 wherein the first node identifier is a public key.

17. The computer usable program product of claim 16 further comprising code for performing the step of receiving a challenge from the second application whereby a response is provided using a private key corresponding to the public key.

18. The computer usable program product of claim 13 further comprising code for performing the steps of receiving a request from the second application to disclose a second set of sensitive data by the first application to the second application; the first application requesting a second set of certified policy commitments from the second application; comparing the second set of certified policy commitments to a second set of predetermined set of policy requirements of the first application to determine acceptability; and upon a positive determination of acceptability of the second set of certified policy commitments, providing the second set of sensitive data to the second application.

19. The computer usable program product of claim 18 wherein the set of certified policy commitments and the second set of certified commitments can be authenticated by utilizing a public key of a certifying authority.

20. The computer usable program product of claim 13 wherein the first set of policy commitments and the predetermined set of policy requirements are selected by a developer of the first application from a standard set of policies.

21. The computer usable program product of claim 18 wherein the second application is located at a second node and a second node identifier is provided with the set of certified policy commitments.

22. The computer usable program product of claim 18 wherein the second node identifier is utilized to verify the authenticity of the second node.

23. The computer usable program product of claim 18 wherein the first node identifier is provided to the second application with the second set of certified policy commitments for verification of identity.

24. A data processing system for managing exchanges of sensitive data, the data processing system comprising:
 a processing device; and
 a memory storing program instructions which when executed by the processing device execute the steps of:
 establishing a secure connection between a first application and a second application across a network;
 the first application utilizing the processing device to request a service across the network from the second application utilizing a separate processing device, the service requiring a disclosure of a first set of sensitive data by the second application;
 responsive to the second application requesting a set of certified policy commitments of the first application in response to the service request, providing across the network the set of certified policy commitments of the first application regarding the first set of sensitive data to the second application for authentication of the set of certified policy commitments and for a determination of acceptability of data handling policies included in the set of certified policy commitments, wherein the set of certified policy commitments provided by the first application includes data handling policies that the first application commits to utilize in handling and protecting the set of sensitive data of the second application; and
 upon a positive authentication of the set of certified policy commitments and a positive determination of acceptability of the included data handling policies by the second application, receiving the service including the disclosure of the first set of sensitive data from the second application through the secure connection;
 wherein the first set of sensitive data can be provided by the second application to the first application pursuant to the set of certified policy commitments provided by the first application if the second application determines that the included data handling policies satisfy a set of predetermined policy requirements of the second application.

25. The data processing system of claim 24 wherein the first application is located at a first node and a first node identifier is provided with the set of certified policy commitments.

26. The data processing system of claim 25 wherein the first node identifier is stored in the memory and wherein multiple applications commonly share the first node identifier.

27. The data processing system of claim 25 wherein the first node identifier is a public key.

28. The data processing system of claim 27 further comprising receiving a challenge from the second application whereby a response is provided using a private key corresponding to the public key.

29. The data processing system of claim 24 further comprising receiving a request from the second application to disclose a second set of sensitive data by the first application to the second application; the first application requesting a second set of certified policy commitments from the second application; comparing the second set of certified policy commitments to a second set of predetermined set of policy requirements of the first application to determine acceptability; and upon a positive determination of acceptability of the second set of certified policy commitments, providing the second set of sensitive data to the second application.

30. The data processing system of claim 29 wherein the set of certified policy commitments and the second set of certified commitments can be authenticated by utilizing a public key of a certifying authority.

31. The data processing system of claim 24 wherein the first set of policy commitments and the predetermined set of policy requirements are selected by a developer of the first application from a standard set of policies.

32. The data processing system of claim 29 wherein the second application is located at a second node and a second node identifier is provided with the set of certified policy commitments.

33. The data processing system of claim 32 wherein the second node identifier is utilized to verify the authenticity of the second node.

34. The data processing system of claim 29 wherein the first node identifier is provided to the second application with the second set of certified policy commitments for verification of identity.

35. The method of claim 1 further comprising the first application registering with a certifying authority with a first node public key upon being downloaded to the first node.

* * * * *